United States Patent [19]

Saito et al.

[11] 4,341,560
[45] Jul. 27, 1982

[54] WATERPROOF GYPSUM MOLDED PRODUCT

[75] Inventors: Masumi Saito, Kobe; Eiichi Hirai, Takarazuka; Masao Endo; Toru Nishino, both of Nishinomiya, all of Japan

[73] Assignee: Kurashiki Boseki Kabushiki Kaisha, Kurashiki, Japan

[21] Appl. No.: 191,824

[22] Filed: Sep. 26, 1980

[30] Foreign Application Priority Data

Oct. 2, 1979 [JP] Japan .................. 54-127488

[51] Int. Cl.$^3$ .................. C04B 11/14
[52] U.S. Cl. .................. 106/87; 106/111
[58] Field of Search .................. 106/87, 111, 314

[56] References Cited

U.S. PATENT DOCUMENTS 4,040,850 8/1977 Kyri et al. .................. 106/87
4,042,409 8/1977 Tereda et al. .................. 106/111

FOREIGN PATENT DOCUMENTS 873805 7/1961 United Kingdom .................. 106/111
929375 6/1963 United Kingdom .................. 106/111

*Primary Examiner*—James Poer
*Attorney, Agent, or Firm*—Berman, Aisenberg & Platt

[57] ABSTRACT

The present invention provides a gypsum molded product having excellent waterproof properties without impaired strength by adding alkaline metal alkylsiliconates or phenylsiliconates together with calcium hydroxide or calcium oxide to gypsum; poly($\alpha,\beta$-unsaturated carboxylic acid) may be used in combination with the above, if desired. According to the present invention, the preparation of a gypsum molded product, particularly a gypsum from desulfurization of exhaust gas, is contemplated.

8 Claims, 1 Drawing Figure

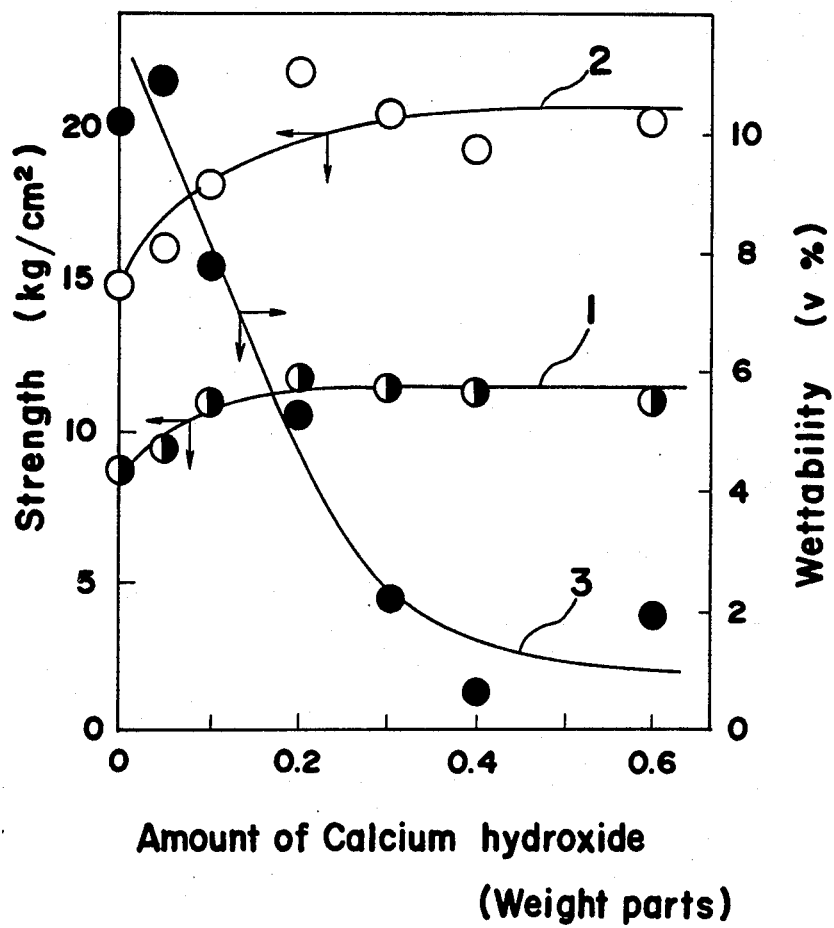

WATERPROOF GYPSUM MOLDED PRODUCT

DETAILED DESCRIPTION OF INVENTION

The present invention relates to a waterproof gypsum molded product.

As products have not only excellent fire resistance and adiabatic properties, as well as comparatively high strength, they are particularly useful as building materials. However, gypsum molded products can not be applied to a place exposed to rain and liable to be drenched and condensed, such as a roof, outside wall, bath room, kitchen and toilet, because of its "waterproofing" properties the product is merely applied for a place such as ceiling, floor, inside wall and the like.

Recently, a large amount of gypsum was produced as a by-product in desulfurization of an exhaust gas and enlargement of effective use of the gypsum is required. For the sake of the noted enlargement, several processes have been proposed to impart waterproofness to a gypsum molded product. For example, Japanese Patent Publication (unexamined) No. 136224/77 discloses combining an alkylsilicate compound with a slurry of a gypsum mixture as formed by adding an $\alpha$-hemihydrate gypsum and/or II-type anhydrous gypsum to $\beta$-hemihydrate gypsum to make a hydrated product. Japanese Patent Publication No. 1224/78 shows mixing a gypsum or a gypsum composite with a water-soluble alkaline salt, such as a sodium or potassium salt, of silicone polymeric material. Japanese Patent Publication (unexamined) No. 33524/79 discloses using an aqueous solution of metal alkylsiliconate or phenylsiliconate for a building material containing gypsum as a principal component.

The aforementioned silicone compound imparts excellent waterproofness to gypsum molded products, while it decreases mechanical strength of the product. Therefore, when the silicone compound is used as a water repellent or waterproofing agent, a sufficient improvement in waterproofness must be accompanied by a minimal decrease in mechanical strength. However, a sufficiently improved method had not been known.

It has been found that addition of a calcium hydroxide or a calcium oxide to gypsum in combination with the silicone compound or an additional use of poly($\alpha,\beta$-unsaturated acid ester) emulsion solved the preceding problems.

The sole FIGURE provides a graphic illustration of the effect on strength and wetability of molded gypsum products by increasing the calcium hydroxide content thereof.

The present invention relates to a waterproof gypsum molded product formed by a combination of gypsum, aqueous solution of alkaline metal alkylsiliconates or phenylsiliconates and calcium hydroxide or calcium oxide as essential components, and also a waterproof gypsum molded product formed by a combination of gypsum, aqueous solution of alkaline metal alkylsiliconates or phenylsiliconates, poly($\alpha,\beta$-unsaturated carboxylic acid ester) emulsion and calcium hydroxide or calcium oxide.

In the present invention, the gypsum may be selected from the group consisting of natural gypsum and chemical gypsum, $\alpha$- or $\beta$-hemihydrate gypsum as produced by calcining a gypsum from desulfurization of exhaust gas.

As alkaline metal alkylsiliconates or phenylsiliconates, there are sodium methylsiliconate, sodium ethylsiliconate, sodium propylsiliconate, potassium methylsiliconate, potassium ethylsiliconate, potassium propylsiliconate, sodium phenylsiliconate, sodium benzylsiliconate, potassium phenylsiliconate, potassium benzylsiliconate. Such alkaline metal siliconates are used in aqueous solution form.

The amount of the aqueous solution of alkaline metal siliconates to be used is not critical, but it is preferably from 0.5 to 2 parts by weight based on 100 parts by weight of gypsum. The use more than 2 parts by weight may decrease the strength of the molded product and is not economical.

Examples of the poly($\alpha,\beta$-unsaturated carboxylic acid ester) are poly(methyl acrylate), poly(ethyl acrylate), poly(butyl acrylate), poly(methyl methacrylate), poly(ethyl methacrylate), poly(butyl methacrylate), copolymer of acrylic acid or methacrylic acid with other monomers, and partially-hydrolized materials, which may be emulsified on or after of polymerization. Particularly, an emulsion of polymer having excellent alkaline resistance and the lowest film-forming temperature (less than 45° C.) is preferable.

An emulsion of poly($\alpha,\beta$-unsaturated carboxylic acid) imparts weathering stability, alkaline resistance, water repellency, waterproofness and the like to a gypsum molded product. Furthermore, in case of foamed materials, said emulsion not only prevents powdering or whitening on the surface of the foamed materials, but also stabilizes.

The preferable amount of the poly($\alpha,\beta$-unsaturated carboxylic acid ester) emulsion is from 5 to 20 parts by weight based on 100 parts by weight of gypsum.

In the present invention, the calcium hydroxide or the calcium oxide is used in at least 0.1 part by weight, particularly more than 0.2 part by weight, based on 100 parts by weight of gypsum.

The noted essential components are blended with a suitable amount of water, such as from 30 to 80 parts by weight based on 100 parts by weight of gypsum, to make a slurry and then cast, molded and dried to give a waterproof gypsum molded product.

The gypsum molded product of the present invention may be lightened in accordance with the purpose. A method of lightening is not critical, but a foaming method comprising generation of gases in the slurry during solidification is preferable, because such method yields a uniform lightweight molded product. The lightweight gypsum molded product may be produced by foaming slurry in the presence of hydrogen peroxide and degradation catalyst. The amount of hydrogen peroxide used as a foaming agent may be varied according to the required density of the molded product. In general, it is preferable to use 0.4 to 2.0 parts by weight of hydrogen peroxide (35% by weight) based on 100 parts by weight of the gypsum.

The degradation catalyst for hydrogen peroxide, as used in the present invention is preferably selected from cobalt compounds, such as cobalt sulfate, cobalt nitrate, cobalt chloride and the like, considering activity of the catalyst, condition of foaming, density of foamed molded product, slurry setting time and the like. Of course, the catalyst is not restricted to a cobalt salt. If desired, an agent to control the pot life of the slurry, such as critic acid and potassium sulfate, may be combined.

According to the present invention, the problem that the aforementioned silicone compound (having a excellent ability as a water repellent or a waterproofing) agent weakens a gypsum molded product can be solved.

That is, the gypsum molded product according to the present invention has excellent waterproofness and mechanical strength and thus is useful for various applications, particularly as building material.

The present invention enlarges the application of gypsum and contributes to effective use of gypsum which is produced in large amounts as a by-product in desulfurization of exhaust gas, which is widely employed for preventing pollution.

The invention will be described further in conjugation with examples showing the practice of the present invention. These examples, however, are not to be construed as limiting the invention to their details.

EXAMPLE 1

Seven kinds of molded product are prepared according to the formulations as shown in Table 1 (molded product 1 is a comparative product).

TABLE 1

| components | amount parts by weight No. of molded product | | | | | | |
|---|---|---|---|---|---|---|---|
| | 1 | 2 | 3 | 4 | 5 | 6 | 7 |
| water | 50 | 50 | 50 | 50 | 50 | 50 | 60 |
| citric acid | 0.02 | 0.02 | 0.02 | 0.02 | 0.02 | 0.02 | 0.02 |
| calcium hydroxide | — | 0.05 | 0.1 | 0.2 | 0.3 | 0.4 | 0.6 |
| potassium methylsiliconate (50 weight % solid) | 1 | 1 | 1 | 1 | 1 | 1 | 1 |
| emulsion of poly(ethyl acrylate) (45 weight % solid) | 10 | 10 | 10 | 10 | 10 | 10 | 10 |
| hemihydrate gypsum | 100 | 100 | 100 | 100 | 100 | 100 | 100 |
| 6% by weight of hydrogen peroxide | 6 | 6 | 6 | 6 | 6 | 6 | 6 |
| cobalt (II) sulfate | 0.05 | 0.05 | 0.05 | 0.05 | 0.05 | 0.05 | 0.05 |

Water, citric acid, calcium hydroxide, potassium alkylsiliconate, emulsion of poly(acrylic acid ester), hemihydrate gypsum and cobalt (II) sulfate are mixed with stirring to prepare gypsum slurries. After the hydrogen peroxide (6% by weight) is added to the resultant slurry with sufficient stirring, the mixtures are cast into molds (4 cm×4 cm×16 cm) and removed from the molds after one hour. The molded products are permitted to stand at 50° C. for 24 hours to prepare gypsum molded products.

The physical properties of the gypsum molded products are shown in Table 2.

TABLE 2

| physical properties | molded product | | | | | | |
|---|---|---|---|---|---|---|---|
| | 1 | 2 | 3 | 4 | 5 | 6 | 7 |
| specific gravity ($\rho$) | 0.47 | 0.52 | 0.48 | 0.47 | 0.51 | 0.54 | 0.64 |
| bending strength ($F_{0.5}$) (Kg/cm²)[1] | 8.7 | 9.4 | 10.9 | 11.7 | 11.3 | 11.3 | 11.0 |
| compressive strength ($F'_{0.5}$) (Kg/cm²)[2] | 14.9 | 16.2 | 18.3 | 22.1 | 20.7 | 19.3 | 20.4 |

TABLE 2-continued

| physical properties | molded product | | | | | | |
|---|---|---|---|---|---|---|---|
| | 1 | 2 | 3 | 4 | 5 | 6 | 7 |
| wettability (V %)[3] | 10.2 | 10.9 | 7.8 | 5.3 | 2.2 | 0.7 | 1.9 |

[1] The bending strength ($F_{0.5}$) is a calculated value according to formula:
$F_{0.5} = F(0.5/\rho)^{2.2}$,
wherein $F_{0.5}$ is a calculated bending strength of the molded product, assuming its specific gravity is 0.5; F is an observed bending strength of the molded product having a specific gravity of $\rho$; $\rho$ is an observed specific gravity of the molded product.

[2] The compressive strength $F'_{0.5}$ is a calculated value according to formula:
$F'_{0.5} = F'(0.5/92)^{2.5}$,
wherein $F'_{0.5}$ is a calculated compressive strength of the molded product, assuming its specific gravity is 0.5; F' is an observed compressive strength of the molded product having a specific gravity of $\rho$, and $\rho$ is an observed specific gravity of the molded product.

[3] The wettability is calculated by the formula:

$$\text{wettability} = \frac{\text{Weight of molded product (g) after soaking into water [A]} - \text{weight of dry molded product (g)}}{\text{volume of molded product (cm}^3\text{)}} \times 100$$

wherein [A] is determined by soaking the molded product into a streaming water having a flow rate of about 150 ml/min. for 24 hours in the manner that the upper surface of the molded product is in 2cm below the stream surface.

The relation between bending strength, the compression strength and the wettability in Table 1 and the amount of calcium hydroxide to be used in Table 2 is illustrated in the FIGURE of drawing which shows the relationship between the amount of calcium hydroxide (abscissa) and the bending strength, the compressive strength and the wettability by (1), (2) and (3), respectively (the strength is expressed by the left longitudinal axis and the wettability is expressed by the right axis).

EXAMPLE 2

Four kinds of molded product are prepared according to formulations of Table 3 (molded products 8 and 9 are comparative products).

TABLE 3

| components | amount parts by weight molded products | | | |
|---|---|---|---|---|
| | 8 | 9 | 10 | 11 |
| water | 55 | 54.5 | 54.5 | 44 |
| citric acid | 0.04 | 0.04 | 0.04 | 0.02 |
| calcium hydroxide | — | — | 0.2 | 0.2 |
| potassium methylsiliconate (50 weight % solid) | — | 1 | 1 | 1 |
| emulsion of poly(ethyl acrylate) (45 weight % solid) | — | — | — | 10 |
| hemihydrate gypsum | 100 | 100 | 100 | 100 |

The components in Table 3 are mixed with stirring to give gypsum slurries. The slurries are cast into molds (4 cm×4 cm×16 cm) and removed after one hour. Standing for one day and night at room temperature, the products are dried for 24 hours at 50° C. to give gypsum molded products, the physical properties of which are shown in Table 4.

TABLE 4

| physical properties | molded product | | | |
|---|---|---|---|---|
| | 8 | 9 | 10 | 11 |
| bending strength (Kg/cm²)[1] | 90.5 | 86.7 | 87.0 | 90.1 |
| wettabilities (V %)[2] | 20.6 | 5.3 | 1.7 | 0.5 |

[1] and [2] are determined by the same manner as described in Example 1.

What is claimed is:

1. A composition for a waterproof gypsum molded product which comprises a combination of the following essential components: (a) gypsum (b) alkaline metal alkylsiliconate or phenylsiliconate and (c) calcium hydroxide or calcium oxide, the amount of (c) being sufficient to counteract a decrease in strength of the molded product attributable to (b).

2. A composition of claim 1 comprising at least 0.1 part by weight of (c) per 100 parts by weight of gypsum.

3. A composition of claim 1 which further comprises a poly($\alpha,\beta$-unsaturated carboxylic acid ester) emulsion.

4. A composition of claim 3 comprising at least 0.1 part by weight of (c) per 100 parts by weight of gypsum.

5. A composition of claim 3 or claim 4 wherein the carboxylic acid is acrylic acid or methacrylic acid.

6. A waterproof gypsum molded product of a composition according to claims 1, 2, 3, or 4 wherein in premolded condition (b) is in aqueous solution form.

7. A waterproof gypsum molded product of a composition of claim 5 wherein in premolded condition (b) is in aqueous solution form.

8. A waterproof gypsum molded product of a foam composition according to claim 3 or 4 wherein in premolded condition (b) is in aqueous solution form.

* * * * *

UNITED STATES PATENT AND TRADEMARK OFFICE
CERTIFICATE OF CORRECTION

PATENT NO. : 4,341,560
DATED : July 27, 1982
INVENTOR(S) : Masumi SAITO, Eiichi HIRAI, Masao ENDO and Toru NISHINO It is certified that error appears in the above-identified patent and that said Letters Patent are hereby corrected as shown below:

Column 1, line 7, "products have not only" should read --gypsum molded products have--; line 12, "and condensed" should read --or exposed to condensation--; line 13, ", because" should read --. Because--; line 14, "proofing" should read --proof--; "for" should read --to--; line 15, "such" should read --, such--; line 21, "a" should read --the--; line 22, "dicloses" should read --discloses--.
Column 2, line 32, "preferable amount of the" should read --preferred amount of--. Column 3, lines 3 and 4, "waterproofing) agent" should read --waterproofing agent)--.
Column 4, line 11, "/92" should read --/ρ--.

Signed and Sealed this

Fourteenth Day of August 1984

[SEAL]

Attest:

GERALD J. MOSSINGHOFF

Attesting Officer

Commissioner of Patents and Trademarks